United States Patent [19]

Houser

[11] 4,040,117
[45] Aug. 2, 1977

[54] FAST OPERATING OVERLOAD SWITCHING CIRCUIT FOR UNIVERSAL MOTORS

[75] Inventor: John Martin Houser, Pickens, S.C.

[73] Assignee: The Singer Company, New York, N.Y.

[21] Appl. No.: 626,582

[22] Filed: Oct. 28, 1975

[51] Int. Cl.² .............................................. H02H 7/085
[52] U.S. Cl. ........................................ 361/33; 361/92; 361/100
[58] Field of Search ................... 317/13 R, 31, 33 SC; 318/434, 474, 459, 479, 108, 109; 340/248 B, 248 A; 322/28

[56] References Cited

U.S. PATENT DOCUMENTS

| | | | |
|---|---|---|---|
| 3,127,541 | 3/1964 | Tarjan et al. | 317/13 R |
| 3,600,635 | 8/1971 | Neilson | 317/33 SC |
| 3,696,288 | 10/1972 | Carman | 317/13 R X |
| 3,719,859 | 3/1973 | Frantz et al. | 317/31 |
| 3,784,846 | 1/1974 | Krick et al. | 317/31 X |
| 3,883,782 | 5/1975 | Beckwith | 317/33 SC X |

Primary Examiner—J. D. Miller
Assistant Examiner—Patrick R. Salce
Attorney, Agent, or Firm—Edward L. Bell; Robert E. Smith; Harold Weinstein

[57] ABSTRACT

Circuitry for rapidly switching off the power to a universal motor upon sensing of overloading of the motor. Sudden motor overloading results in rapid speed reduction that is detected by measuring the voltage drop across the motor armature. The circuitry detects this drop and removes a gating signal to a triac switch in series with the motor to remove the power to the motor within one cycle of the applied AC.

7 Claims, 5 Drawing Figures

FAST OPERATING OVERLOAD SWITCHING CIRCUIT FOR UNIVERSAL MOTORS

Small single phase series commutator motors are extensively used in portable hand tools such as saws, drills, sanders, etc. Many of these universal motors are provided with thermal overload protectors or circuit breakers to cut off the power upon the occurrence of excessive heat or current that may cause permanent motor damage. While such devices may operate sufficiently fast to protect the motor, none are fast enough to protect the tool operator from possible injury or the work from being damaged in the event of an abrupt overload such as is encountered when a saw blade or a drill bit binds in the work.

The present invention is a protection circuit that detects overload of a universal motor and very rapidly cuts off the power to the motor. If the motor is operated on AC, it is cut off within one cycle of the applied AC. Thus, the circuit not only provides protection to the motor as with the thermal overload or circuit breaker devices, but when used with a portable hand tool such as a saw, substantially reduces the probability of a serious accident or injury to the saw operator by reducing or eliminating the dangerous "kick-back" that often occurs when a trailing edge of the saw blade binds in the work. Similarly, the circuitry will cut off power to an electric drill to reduce the tendency of the drill to twist when the bit binds in the work.

When a universal motor becomes overloaded and its rotational speed is reduced, there is a drop in voltage across the motor armature, caused partly by the decrease in speed and consequent decrease in the motor generated e.m.f. and also by the increased current and consequent increased IR drop across the series field. Therefore, a motor overload condition may be detected by merely measuring the voltage across the motor armature and noting when the measured voltage drops below a predetermined threshold value.

Briefly described, the invention comprises circuitry that is coupled to measure the voltage across the armature of a universal motor. When a predetermined voltage drop is detected, the circuitry removes a gating signal to a triac in series with the motor armature to cut off further power to the motor.

In the drawings which illustrate a preferred embodiment and alternative embodiments of the invention:

Figure 1:
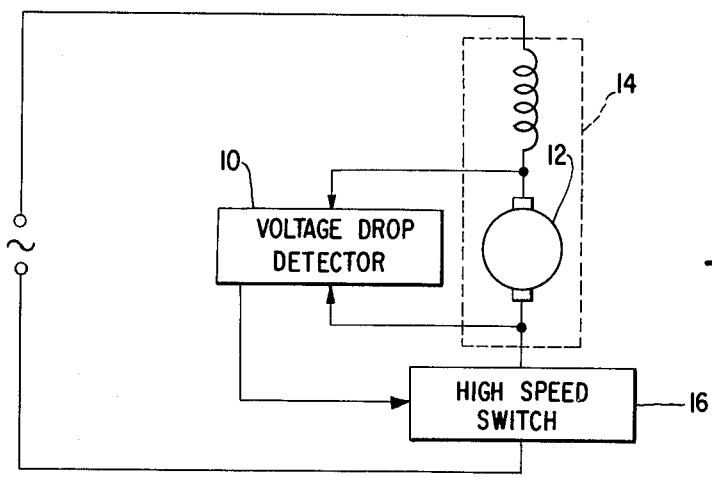
FIG. 1 is a block diagram illustrating the basic concept of the invention.

As previously indicated, a rapid slowdown of the armature caused by a load on a universal motor, results in a corresponding lowering in the measured voltage in the motor armature terminals. As illustrated in FIG. 1 of the drawings, a voltage drop detector 10 is connected across the armature 12 of an uncompensated series motor 14. The voltage drop detector 10 senses a reduced voltage across the armature 12 and if the voltage drop exceeds a predetermined threshold value, detector 10 removes the signal holding a normally open high-speed bi-directional switch 16 in series with motor 14 closed, allowing it to open and cut off further power to the motor.

Figure 2:
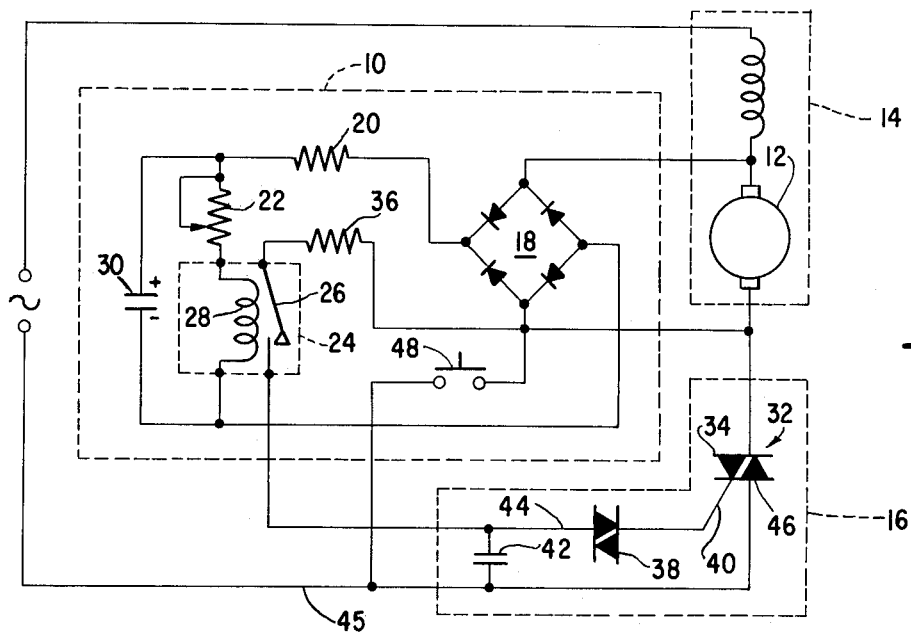
FIG. 2 is a schematic diagram of a preferred embodiment of the invention.

FIG. 2 is a schematic drawing of a preferred embodiment of the invention and illustrates the circuitry contained in the voltage drop detector 10 and high-speed switch 16 of FIG. 1. In FIG. 2, the terminals of armature 12 of an AC fed motor 14 are connected to a diode bridge circuit 18 which rectifies the AC voltage detected across the armature and applies the rectified signal through a 2.7K resistance 20, and a 2.5K potentiometer 22, to the excitation coil of a relay 24 which is made up of a reed switch 26 in the field of a coil 28 having approximately 4,000 turns of No. 32 magnet wire on a ⅜ inch diameter bobbin. Potentiometer 22 and relay 24 are preferably shunted by a relatively large capacitor 30, which may have a value of 10 microfarads to provide filtering of the detected signal, thus preventing line transients and motor brush noise from interfering with the proper operation of the relay 24.

The normally open reed switch 26 of relay 24 is held closed by a voltage of proper amplitude across the armature 12 of the motor 14. In the event of an overload of the motor and a consequent slowing of the armature 12, the reduced voltage across the armature will be rectified by the bridge 18 and will result in a lower voltage across coil 28 of relay 24, thus permitting the reed switch 26 to open.

In the embodiment illustrated in FIG. 2, the high-speed switch includes a triac 32 connected in series between the power source and the motor armature 12. The triac current terminal 34 that is connected to the armature 12 is also connected through a 3.3K resistance 36 to one terminal of the reed switch 26, the other terminal of which is connected through a trigger diac 38 to the control gate 40 of the triac 32. A capacitor 42, having a value of 0.1 Mfd, is connected between the terminal 44 of diac 38 and the input power line 45 that is connected to current terminal 46 of the triac 32.

A normally open momentary contact push button switch 48 is connected in parallel with the triac 32 to provide initial excitation of the motor 14 upon application of the external AC and also to reset the circuitry in the event that overload of the motor has triggered a shutdown of the circuitry. The switch 48 must have sufficient capacity to carry the motor starting current.

For the initial start-up and all subsequent start-ups, a conventional AC power switch (not shown) would be activated at the same time that the reset switch 48 is activated. After the motor 14 is started and the armature 12 accelerates beyond the detection point, the switch 48 will be released to permit the overload circuitry 10 to stand ready to operate responsive to a predetermined voltage drop across the armature 12. Thereafter, only the closed AC power switch is needed to maintain normal operation of the motor 14.

In operation, the potentiometer 22 is adjusted to provide the desired overload threshold to the circuitry. The motor 14 is started by the application of AC power and the depression of switch 48 which applies the AC power directly across the motor 14. When armature 12 has reached the normal operating speed, the voltage across the terminals of the armature is rectified by the bridge 18 and applied to relay coil 28 which closes the contacts of the reed switch 26. When reed switch 26 closes, the capacitor 42 charges through the resistance 36 to the point where the charge on capacitance 42 equals the breakdown voltage of the trigger diac 38. At this point the capacitor is discharged through the trigger diode 38 to the control gate 40 of the triac 32 and the triac is thus gated to connect the power directly to the motor 14. When the motor becomes overloaded or stalled, the voltage across the armature 12 is reduced below the threshold value determined by the setting of potentiometer 22 and the reed switch 26 opens. Since capacitor 42 can no longer be charged, the triac 32 is no longer triggered into conduction at the beginning of each half-cycle of AC line voltage so that the triac isolates the motor from the power source. It is to be noted that with the full wave rectification provided by bridge 18, the voltage across a stalled armature will drop to a sufficiently low value to allow the relay 24 to open, and inactivate the triac 32 and thus the power to the motor within $\frac{1}{2}$ cycle of the applied AC.

Figure 3:
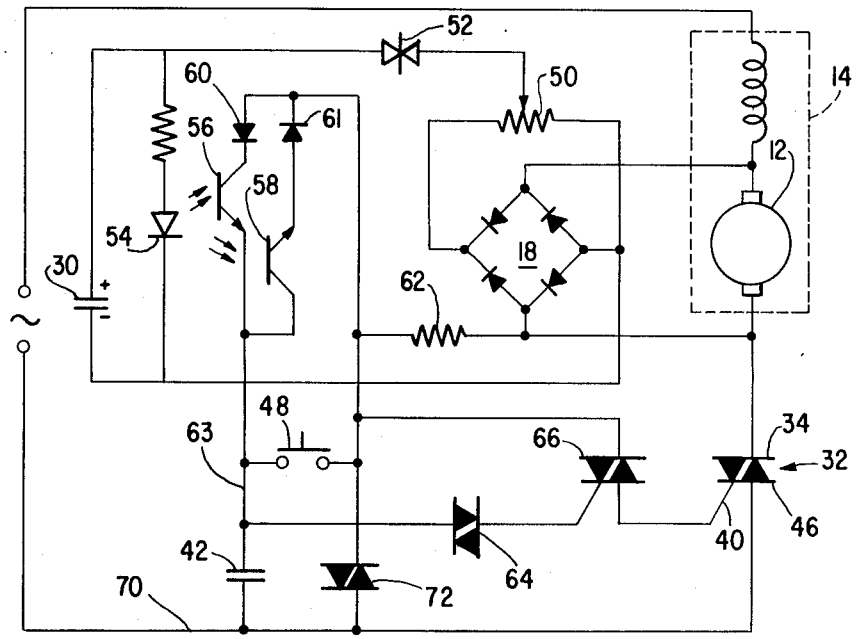
FIG. 3 is a schematic diagram of an alternative embodiment of the invention.

FIG. 3 is a schematic diagram illustrating an alternate circuit in which the relay of FIG. 2 has been replaced with an electro-optic relay comprising a light emitting diode and a pair of phototransistors. Thus, the voltage across the terminals of armature 12 of motor 14 is applied to the rectifying bridge 18 which rectifies that voltage and applies it to the terminals of a threshold adjusting potentiometer 50. The sliding arm of potentiometer 50 is coupled through a silicon bi-directional switch 52 to a light emitting diode 54, the opposite end of which is connected to the negative potential terminal of the bridge 18. Positioned adjacent the light emitting diode 54 is a pair of phototransistors 56 and 58, having their light sensitivity matched to the diode 54. Transistors 56 and 58 are in series with isolation diodes 60 and 61, respectively, and are connected in an opposed parallel circuit to provide bi-directional current control in response to variations in light emitted by the diode 54. Thus, the phototransistor circuit becomes the equivalent of the reed switch 26 described in connection with FIG. 2.

One end of the phototransistor circuit is coupled through a resistance 62 to the junction between the triac 32 and the terminal of the motor armature 12. The opposite end of the phototransistor circuit is coupled, via conductor 63 to one terminal of a diac 64, the opposite terminal of which is coupled to the control gate of a high-gate sensitivity triac 66. One current terminal of triac 66 is coupled to the junction between the phototransistor circuit and resistor 62; the opposite terminal of triac 66 is coupled to the control gate 40 of the triac 32 in series with the motor armature 12. A capacitor 42 is connected between conductor 63 and the AC power conductor 70. In order to protect the phototransistors 56 and 58 from damage due to excessive voltages, the circuit may be stabilized with a diac 72 coupled between line conductor 70 and the junction between the photoconductor circuit and resistance 62.

A normally open momentary contact push button switch may be coupled across triac 32 as described in connection with FIG. 2. If desired, however, the normally open momentary contact switch 48 may be connected in parallel with the phototransistor circuit as illustrated in FIG. 3. In this location the switch carries very small currents and may be of much lower capacity than the switch of FIG. 2. By connecting momentary contact switch 48 in FIG. 2 in parallel with reed switch 26 it will operate the same as that described for switch 48 in FIG. 3. and again a much lower capacity switch may be used.

The operation of the circuitry illustrated in FIG. 3 is similar to that illustrated in FIG. 2. The voltage detected across the armature 12 of the motor 14 is applied to bridge circuit 18 and the full wave rectified signal is applied across the potentiometer 50 which is adjusted to the desired sensitivity, or threshold level, of the circuit. The signal picked up by the slider of potentiometer 50 is applied through a silicon bi-directional switch 52 and thence through the light emitting diode 54 which emits a light proportional to the signal being detected. The light emitted by diode 54 is sensed by phototransistors 56 and 58, which conduct the charge to capacitor 42. In order to keep the current levels through the photoconductors 56 and 58 to a safe level, the signal is applied through diac 64 to the high gate sensitivity triac 66 which, when gated to its conductive state, will trigger the switching triac 32.

Additional protection to the photodiode circuit is provided by a high-breakdown diac 72 which effectively maintains the junction between the phototransistor circuit and resistance 62 at a stable level during the AC voltage reversals across the triac 32. It should be noted that the bi-directional switch 52 in this circuit between potentiometer 50 and the light emitting diode 54 has been added to prevent "soft turnoff", or gradual decay of the signal when the voltage detected across the terminals of armature 12 is gradually reduced. Thus, the bi-directional switch 52 provides a sharp threshold level above which the phototransistors 56 and 58 are conducting and below which they are nonconductive.

Figure 4:
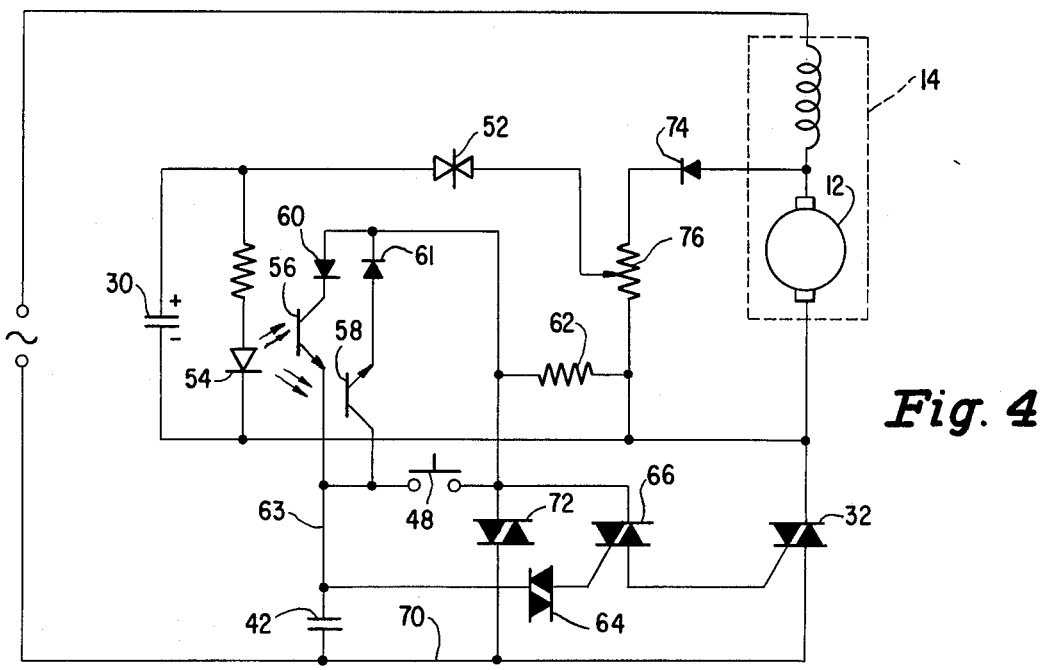
FIG. 4 is a schematic diagram of an embodiment similar to that illustrated in FIG. 3, but which has slower response time.

It will be noted that the circuit shown in FIGS. 2 and 3 employ a full-wave rectification bridge 18 so that sudden drops in the detected voltage across the motor armature 12 can be detected and acted upon with $\frac{1}{2}$ cycle of the applied AC. If such a high-speed detection and cut-off circuit is not required, the circuit may be somewhat simplified by the use of half-wave rectification as illustrated in FIG. 4. The circuitry of FIG. 4. is identical in construction and operation with that describing the connection with FIG. 3 except that the bridge circuit 18 of FIG. 3 has been eliminated and replaced with a half-wave rectifying diode 74 connected in series with a potentiometer 76 across the terminals of armature 12 of the motor 14. In the embodiment illustrated in FIG. 4, the capacitance 30 connected in parallel with the light emitting diode 54, must be of sufficient capacity to smooth the rectified signal to prevent light flicker from diode 54 and the resulting intermediate conductivity of the phototransistors 56, 58.

Figure 5:
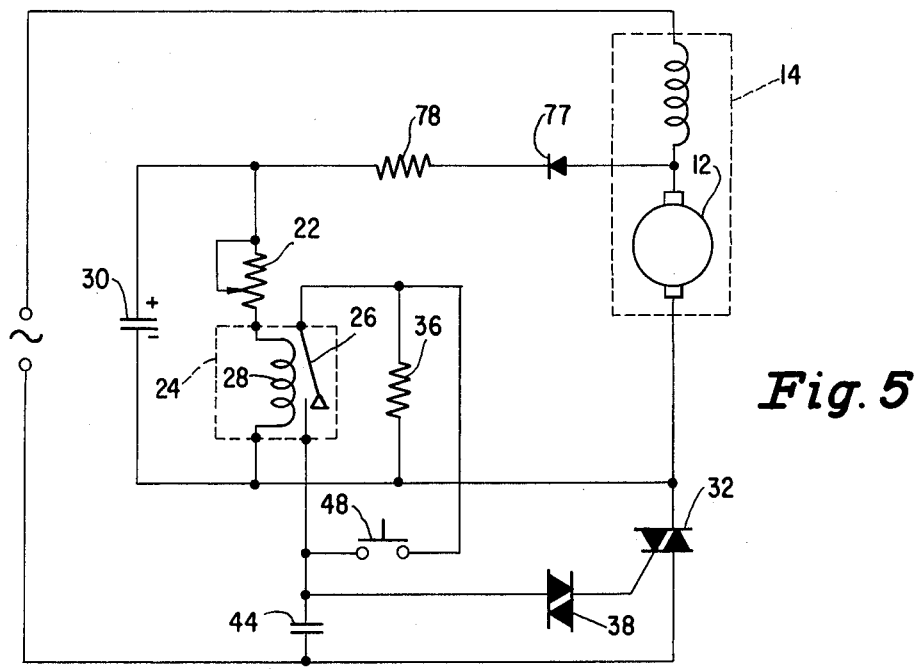
FIG. 5 is a schematic diagram of an embodiment similar to that illustrated in FIG. 2 but with slower response time.

The circuitry illustrated in FIG. 5 is similar to that illustrated in FIG. 2 except that the full-wave rectifier bridge 18 of FIG. 2 has been replaced with a half-wave rectifier diode 77. Diode 77 is connected through resistance 78 to the threshold adjustment potentiometer 22. In all other respects, the circuitry is identical with that illustrated in FIG. 2, except that the normally open momentary push button switch 48 is connected in parallel to the reed switch 26 of FIG. 5, whereas, the switch 48 is connected parallel with the triac 32 in FIG. 2. Thus, the switch 48 of FIG. 5 may be a lighter switch since it does not carry full motor current as does the switch of FIG. 2.

What is claimed is:

1. Fast operating overload protection circuitry for a universal motor comprising:
    a. controllable gating means in the power line to said motor for switching off the power to said motor in response to the removal of an electrical gating signal,
b. voltage detecting means coupled to sense the voltage level across the armature of said motor and for interrupting an electrical gating signal to said gating means when the voltage across said armature falls below the predetermined threshold level,
c. the gating means includes a triac, and
d. the detecting means includes rectifying means coupled to rectify the voltage across said armature.

2. The circuitry claimed in claim 1 wherein said detecting means includes a relay operable in response to the voltage level across said armature, said relay having switching elements for conducting a gating signal to said triac.

3. The circuitry claimed in claim 2 wherein said relay is electro-optic and includes a light producing element which emits light at a level determined by the voltage produced across said armature and further includes a light sensitive switching element positioned to detect the emitted light and to conduct electrical current in response thereto.

4. The circuitry claimed in claim 2 wherein said relay is electromagnetic and includes a coil for generating an electromagnetic field in response to the voltage produced across said armature and further includes a switch element operable in response to the electromagnetic field for conducting electrical gating signals to said triac.

5. The circuitry claimed in claim 2 further including a manual reset switch in parallel with said triac for conducting electrical current to said motor while said triac is not conductive.

6. The circuitry claimed in claim 2 further including a manual reset switch in parallel with the switching element of said relay for gating said triac into conduction while said switching element is not conductive.

7. The circuitry claimed in claim 2 further including a variable resistance in series with said relay for controlling the threshold level at which said relay switching element becomes nonconductive.

* * * * *